(12) United States Patent
Chen et al.

(10) Patent No.: US 8,995,153 B2
(45) Date of Patent: Mar. 31, 2015

(54) PASSIVE POWER FACTOR CORRECTION CIRCUIT

(71) Applicant: Industrial Technology Research Institute, Hsin-Chu (TW)

(72) Inventors: Po-Yen Chen, Taipei (TW); Ching-Tsai Pan, Hsinchu (TW)

(73) Assignee: Industrial Technology Research Institute, Hsin-Chu (TW)

( * ) Notice: Subject to any disclaimer, the term of this patent is extended or adjusted under 35 U.S.C. 154(b) by 113 days.

(21) Appl. No.: 13/763,222

(22) Filed: Feb. 8, 2013

(65) Prior Publication Data

US 2014/0029318 A1    Jan. 30, 2014

(30) Foreign Application Priority Data

Jul. 24, 2012    (TW) .............................. 101126638 A

(51) Int. Cl.
*H02M 1/12* (2006.01)
*H02M 1/42* (2007.01)

(52) U.S. Cl.
CPC ................ *H02M 1/12* (2013.01); *Y02B 70/123* (2013.01); *H02M 1/126* (2013.01); *H02M 1/4266* (2013.01)
USPC .................... 363/39; 363/44; 363/46; 363/47; 363/48; 363/125; 323/207; 323/208

(58) Field of Classification Search
CPC ...... H02M 1/12; H02M 1/4266; H02M 1/126
USPC .................... 363/39, 44, 46, 47, 48, 125, 126; 323/207, 208
See application file for complete search history.

(56) References Cited

U.S. PATENT DOCUMENTS

| 5,866,993 | A | 2/1999 | Moisin |
| 6,018,472 | A | 1/2000 | Vogman |
| 6,201,368 | B1 | 3/2001 | Webster |
| 7,821,801 | B2 | 10/2010 | Janson et al. |
| 8,213,190 | B2* | 7/2012 | Li ................................ 363/21.04 |
| 8,427,064 | B2* | 4/2013 | Zhang ........................... 315/247 |

(Continued)

FOREIGN PATENT DOCUMENTS

| CN | 2904458 Y | 5/2007 |
| TW | M368113 | 11/2009 |

(Continued)

OTHER PUBLICATIONS

Hui et al., A Novel Passive Offline LED Driver With Long Lifetime, IEEE Transactions on Power Electronics, 2010, vol. 25(10), pp. 2665-2672.

(Continued)

*Primary Examiner* — Timothy J Dole
*Assistant Examiner* — Sisay G Tiku
(74) *Attorney, Agent, or Firm* — Morris Manning & Martin LLP; Tim Tingkang Xia, Esq.

(57) ABSTRACT

The disclosure relates to a passive power factor correction circuit. The passive power factor correction circuit comprises: a filtering device being used for decreasing high order harmonic of an input current; a resonance device being coupled to the filtering device for controlling operation time of the input current; and a suppression device being coupled to the resonance device for suppressing ripple of the input current.

6 Claims, 6 Drawing Sheets

(56) References Cited

U.S. PATENT DOCUMENTS

| | | |
|---|---|---|
| 2007/0057642 A1 | 3/2007 | Pruett |
| 2010/0039038 A1* | 2/2010 | Lam et al. .................. 315/224 |
| 2013/0181625 A1* | 7/2013 | Pan .......................... 315/200 R |
| 2014/0056046 A1* | 2/2014 | Tsai et al. .................. 363/126 |
| 2014/0098584 A1* | 4/2014 | Gucyski et al. ............. 363/126 |

FOREIGN PATENT DOCUMENTS

| | | |
|---|---|---|
| TW | M382658 | 6/2010 |
| TW | 201136115 A | 10/2011 |

OTHER PUBLICATIONS

Ng et al., Design of a Single Ultra-Low-Loss Magnetic Ballast for a Wide Range of T5 High-Efficiency Fluorescent Lamps, IEEE Transactions on Industrial Electronics, 2012, vol. 59(4), pp. 1849-1858.

Intellectual Property Office, Ministry of Economic Affairs, R.O.C., "Office Action", Dec. 25, 2014, Taiwan.

* cited by examiner

PASSIVE POWER FACTOR CORRECTION CIRCUIT

CROSS REFERENCE TO RELATED APPLICATION

The present application is based on, and claims priority from, Taiwan (International) Application Serial Number 101126638, filed on Jul. 24, 2012, the disclosure of which is hereby incorporated by reference herein in its entirety.

TECHNICAL FIELD

The present disclosure relates to a passive power factor correction circuit, and more particularly, to a passive power factor correction circuit which can be effectively applied in the current mode AC to DC converter.

TECHNICAL BACKGROUND

The conventional passive power factor correction circuit is constituted by some passive elements such as inductors, capacitors, diodes and the likes. By changing paths which allow the input current flowing into the filter capacitor and time, the waveform and phase of input current are ameliorated, the harmonic is suppressed and the power factor is improved. Although the power factor obtained from the passive power factor correction circuit is less than the active power factor correction circuit, the passive power factor correction circuit can still make the circuit power factor value increased to 0.7~0.9, current harmonic distortion total amount declined to below 50%. In addition, the passive power factor correction circuit further has some advantages, such as no active switch element, simple circuit structure, low cost and no electromagnetic interference problem generated form the active switch, so now it is still widely used in medium and small power electronic equipments. However, the operation point designed by the passive power factor correction circuit is easily affected by the input voltage, input voltage frequency and output power, so as to affect the result of power factor correction.

The conventional AC/DC converter works under the difference between the input voltage and the current phase so as to lower the power factor and seriously distort current total harmonic. Furthermore, only if the input voltage is higher than the capacitor voltage, the output capacitor is charged by the input power so as to decrease the charge time of the capacitor, and the turn-on time of the rectified diode gets shorter with the charge time and the peak value of the conductive current increases, causing that the power factor is decreased and the input current waveform is distorted. The equipments with lower power factor not only waste energy but also increase unnecessary reactive power required by the electricity company. Therefore, how to improve the power factor has become one of the important topics for power electronics.

The conventional power factor correction circuit can be divided into the active power factor correction circuit and the passive power factor correction circuit according to whether it has active switch elements. FIG. 1 shows a bridge rectified circuit with single phase being one of conventional passive power factor correction circuits. Owing to the output filter capacitor $C_{dc}$ existence, it causes that the input current contains large amount of harmonic distortion so as to lower the power factor and seriously distort current total harmonic distortion. Moreover, the inductance element of the traditional passive correcting circuit is mainly composed of silicon steel sheet and connected the bridge rectifier input end in tandem, as shown in the single-phase circuit of FIG. 2, or the inductance element also can combine with a capacitor to become a LC filter or CLC (π type) filter. Since the inductor composed of silicon steel sheet is bulky and heavy, and the highest power factor of the circuit is only up to around 75%. Additionally, size of the passive power factor correction circuit will be expanded while the output power increase or the rated input voltage decrease. Although the bridge rectified circuit of the conventional passive power factor correction circuit has simple and durable advantages, its poor performance does not meet nowadays application needs.

The main advantages of the conventional active power factor correction circuit include the power factor being up to 0.99, the total amount of electric current harmonic distortion being less than 10%, as shown in the single-phase circuit of FIG. 3. Moreover, the advantages further include the input voltage with wider range, the stable output voltage, the small size of magnetic element, and not be affected by the output power variation. However, the active power factor correction circuit requires extra control circuit and the price, electromagnetic noise and robustness thereof are nowhere near as good as the passive power factor correction circuit.

The architecture of conventional power factor correction circuit with low frequency is similar as the conventional active power factor correction circuit, besides the active switch elements works at low frequency switching. Basic operation principles of the conventional power factor correction circuit with low frequency is to use two times of the commercial frequency as the switch frequency of the active switch element so as to reduce the high frequency electromagnetic interference, and it obtains the perfectly power factor value according to the variation of the switch-off and turn-on time, as shown in single phase circuit of FIG. 4. What is more, the advantages of the power factor correction circuit with low frequency include high efficiency, simple controlling, do not need high-power element and no high-frequency electromagnetic interference. For the household appliance system which relies on frequency convector as a main part, such as refrigerators, air conditioning etc., the power factor correction circuit with low frequency can effectively improve the power factor and reduce the total amount of current harmonic distortion.

TECHNICAL SUMMARY

In one embodiment, the present disclosure provides a passive power factor correction circuit comprising: a filtering device being used for decreasing high order harmonic of an input current; a resonance device being coupled to the filtering device for controlling operation time of the input current; and a suppression device being coupled to the resonance device for suppressing ripple of the input current.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

Figure 1:
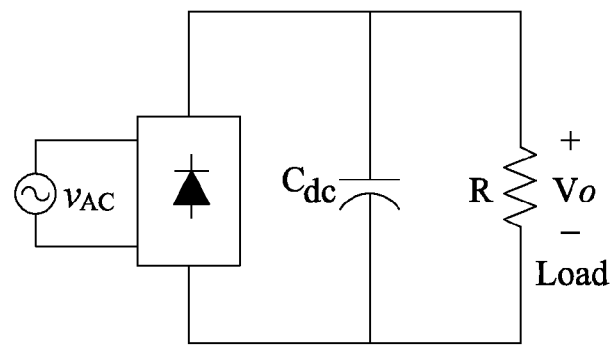
FIG. 1 shows a bridge rectified circuit with single phase being one of conventional passive power factor correction circuits.
Figure 2:
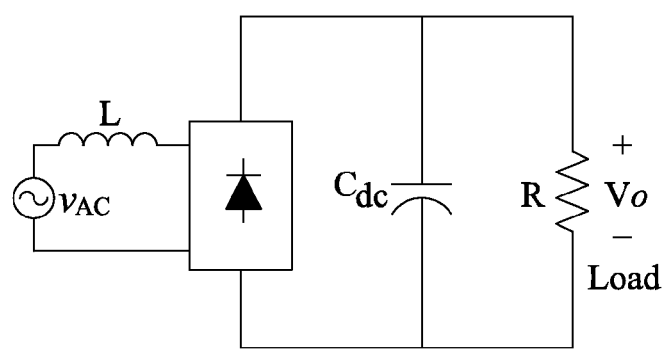
FIG. 2 shows another bridge rectified circuit with single phase being one of conventional passive power factor correction circuits.
Figure 3:
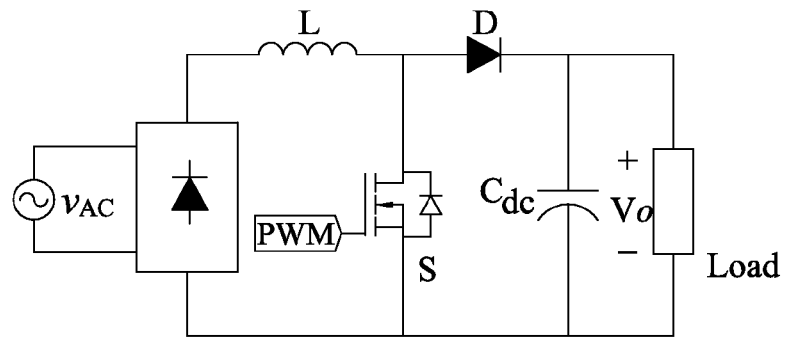
FIG. 3 shows the conventional active power factor correction circuit.
Figure 4:
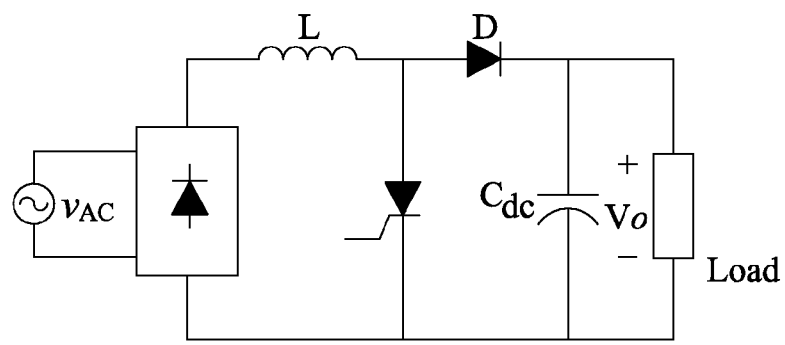
FIG. 4 shows the conventional power factor correction circuit with low frequency.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 5:
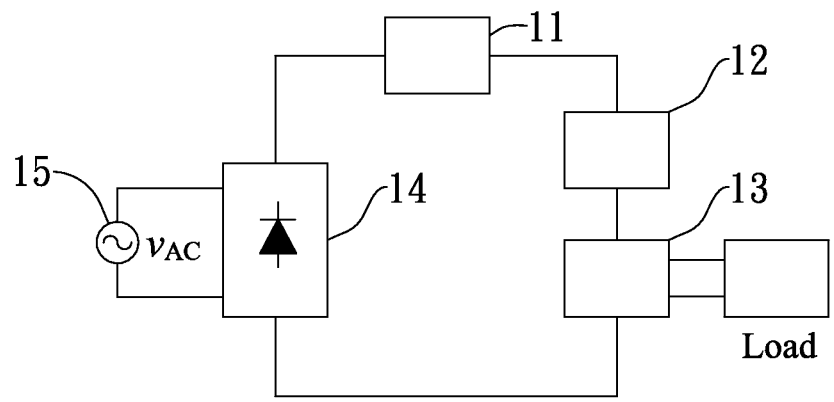
FIG. 5 shows a passive power factor correction circuit according to one embodiment of the present disclosure.

FIG. 5 shows a passive power factor correction circuit according to one embodiment of the present disclosure. The passive power factor correction circuit includes a filtering device 11, a resonance device 12 and a suppression device 13. The filtering device 11 is used for reducing high-order harmonics of an input current, and also includes a filter inductor. Further, the input current is delayed by the filtering device 11 for a period time, and then the input current starts to flow into the circuit, and thereby, the high-order harmonics of the input current is reduced. The resonance device 12 is coupled to the filter device 11 so as to control the operation time of the input current, and reduce the input current high-order harmonics. The resonance device 12 comprises a first inductor and a first capacitor, and the first inductor and the first capacitor are connected in parallel. The suppression device 13 is coupled to the resonator device 12 for suppressing the ripple of the input current. In other words, the suppression device 13 can reduce the input current ripple so as to reduce the ripper of the output current. The suppression device 13 includes a second inductor and a diode. The passive power factor correction circuit comprises a power supply 15, a rectifier 14 and a load. The power supply 15 may be an AC power supply, and the rectifier 14 may be a bridge rectifier or other devices converting AC power into DC power, such as a full-wave rectifier, a half-wave rectifier etc. The rectifier 14 is connected to the power supply 15 for rectifying the power supply 15 and generates the input current. Furthermore, the aforementioned load is connected in series with the second inductor $L_2$, so that the second inductor $L_2$ can suppress the input current ripple which is flowing through the load.

Figure 6:
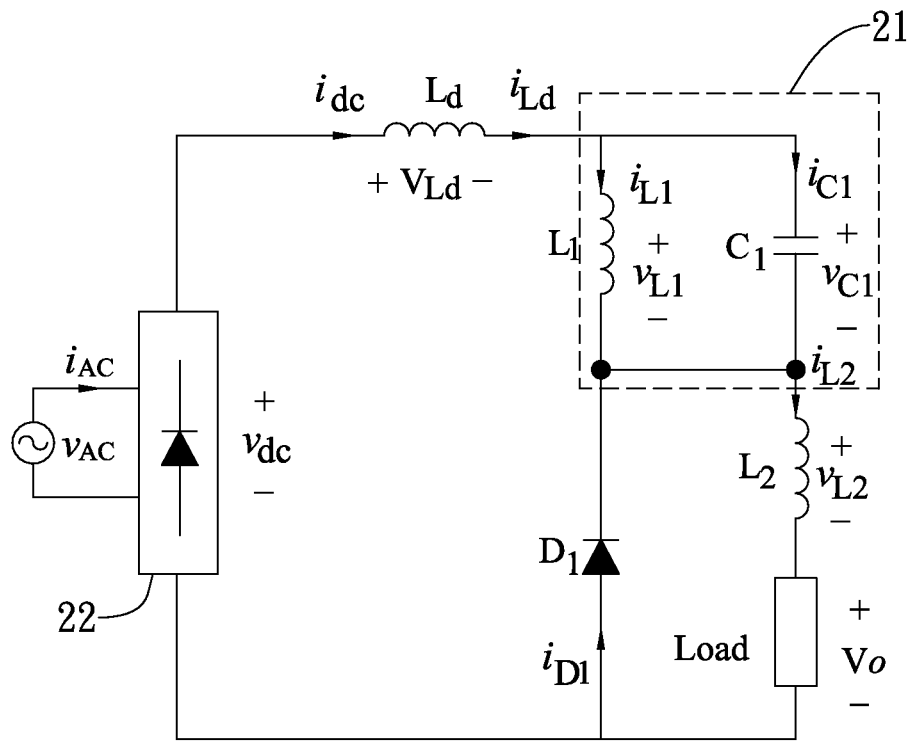
FIG. 6 shows a passive power factor correction circuit applying the structure of FIG. 5.

FIG. 6 shows a passive power factor correction circuit applying the structure of FIG. 5. As shown in FIG. 6, the passive power factor correction circuit comprising: a filtering inductor $L_d$ used for reducing the high-order harmonic of the input current; a resonant circuit 21 coupled to the filtering inductor $L_d$ for controlling operation time of the input current and the resonant circuit 21 comprises a first inductor $L_1$ and a first capacitor $C_1$; a diode $D_1$ coupled to the resonant circuit 21; and a second inductor $L_2$ coupled to the resonant circuit 21, and the second inductor $L_2$ is connected in series to the load and in parallel with the diode $D_1$. The second inductor $L_2$ is used for suppressing the ripper of the input current flowing through the load. The passive power factor correction circuit also comprises an AC power source $v_{AC}$ and a rectifier 22 which are coupled together so as to rectify the AC power supply $v_{AC}$ and generate the input current $i_{dc}$. The rectifier 22 may be a bridge rectifier or or other devices converting AC power into DC power, such as a full-wave rectifier, a half-wave rectifier etc.

Figure 7A:
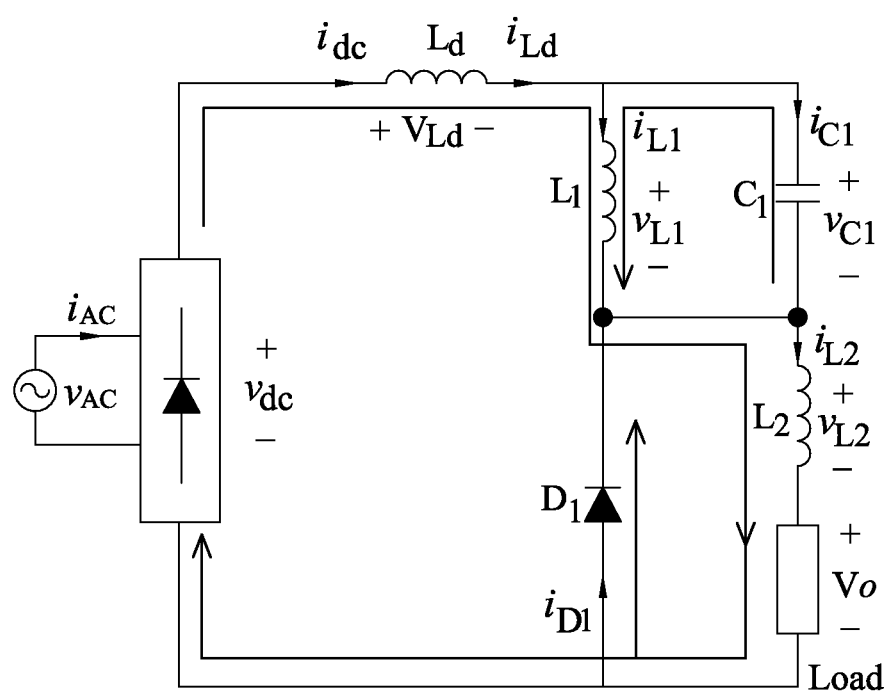
FIG. 7A shows the passive power factor correction circuit of FIG. 6 operating in the first mode.
Figure 7B:
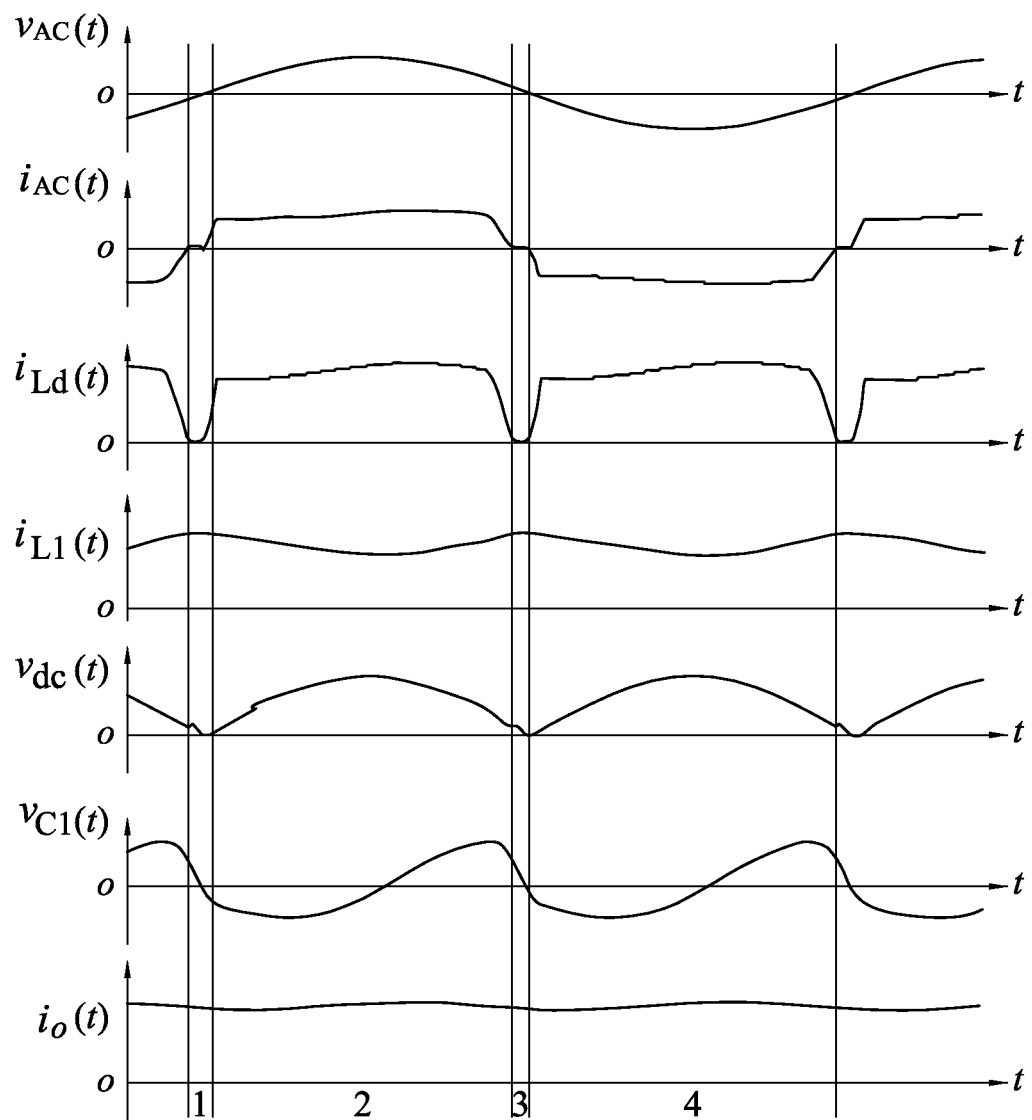
FIG. 7B is a waveform diagram of FIG. 7A.

FIG. 7A shows the passive power factor correction circuit of FIG. 6 operating in the first mode. When the sum of voltage $v_{C1}$ cross the first capacitor $C_1$ and the voltage $V_{Ld}$ cross the filtering inductor $L_d$ is greater than the DC voltage $v_{dc}$, the diode $D_1$ turns on, the first inductor $L_1$ is charged by the first capacitor $C_1$, and the load receives the energy released from the second inductor $L_2$ via the diode $D_1$. In addition, the filter inductor $L_d$ and the first inductor $L_1$ are respectively charged by the DC voltage $v_{dc}$, and when the diode $D_1$ of the passive power factor correction circuit is cut-off, the passive power factor correction circuit completes a cycle of action. Meanwhile, the rectified DC voltage $v_{dc}$ becomes zero and the current $i_{Ld}$ of the filtering inductor $L_d$ remains zero for reducing the high order harmonic of the input current. FIG. 7B shows a waveform diagram illustrating the passive power factor correction circuit of FIG. 7A operating in the first mode. As shown in FIG. 7B, $v_{AC}$ represents the AC power supply, $i_{AC}$ represents the AC current, $i_{Ld}$ represents the current of the filter inductor $L_d$, $i_{L1}$ represents the current of the first inductor $L_1$, $v_{dc}$ represents the DC input voltage, $v_{C1}$ represents the voltage of the first capacitor $C_1$, and $i_o$ is the current of the load.

Figure 8A:
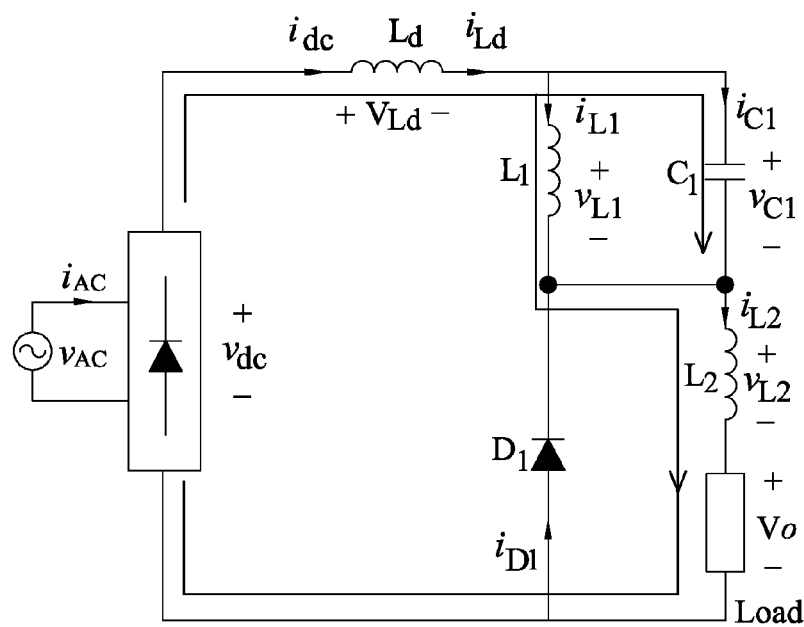
FIG. 8A shows the passive power factor correction circuit of FIG. 6 operating in the second mode.
Figure 8B:
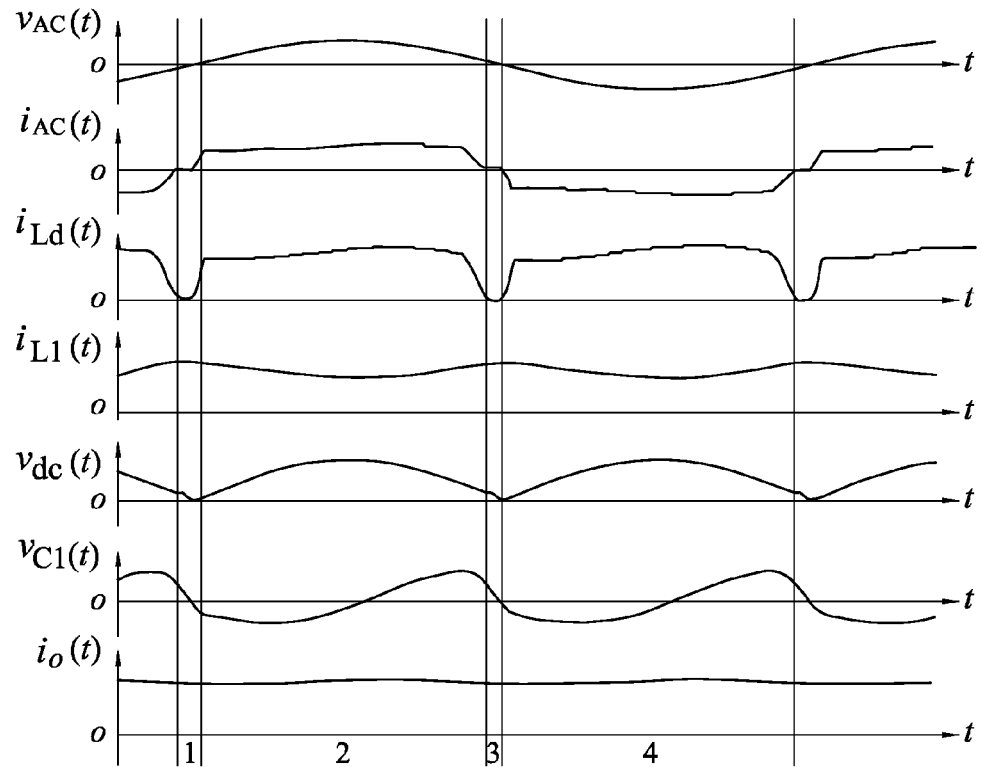
FIG. 8B is the waveform diagram of FIG. 8A.

FIG. 8A shows the passive power factor correction circuit of FIG. 6 operating in the second mode. When the DC voltage $v_{dc}$ increases with increasing the input AC power supply $v_{AC}$, the DC voltage $v_{dc}$ will greater than the sum of the voltage $V_{Ld}$ cross the filtering inductor $L_d$, the voltage $v_{C1}$ cross the first capacitor $C_1$, and the voltage $v_{L2}$ cross the second inductor $L_2$ and the voltage $V_o$ of the load. At this time, the filtering inductor $L_d$, the first capacitor $C_1$, the first inductor $L_1$ and the second inductor $L_2$ are respectively charged by the DC voltage $v_{dc}$, and the current $i_{D1}$ of the diode $D_1$ is zero. When the diode $D_1$ in the circuit turns on, the passive power factor correction circuit will enter the first mode. FIG. 8B shows a waveform diagram illustrating the passive power factor correction circuit of FIG. 8A operating in the second mode.

Figure 9:
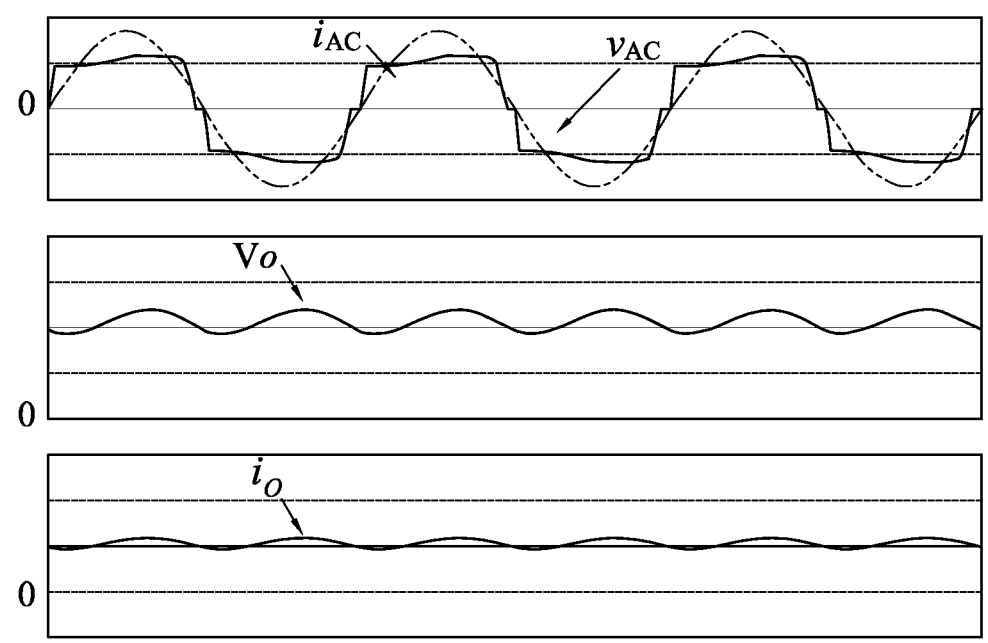
FIG. 9 shows a waveform diagram of an example applying the present disclosure.

FIG. 9 shows a waveform diagram of an example applying the present disclosure. Take 100 W LED load as an example, 100 W LED load is consisted by 24 LED connected in serial, and the load current $i_o$ ($i_o=i_{L2}$) is 1 A. When the input voltage is 110 Vrms, analog waveforms of the AC input power $v_{AC}$, the AC input current $i_{AC}$, the output voltage $V_o$, the output current $I_o$ in the passive power factor correction circuit of the present disclosure are orderly illustrated in FIG. 9. When the 100 W LED is used as the output load, the circuit power factor is 0.966 and meets the purpose of the high power factor.

The passive power factor correction circuit of the present disclosure may be used as a current mode AC/DC converter. After the single phase or three phase AC voltage source received by the passive power factor correction circuit is rectified by the full bridge rectified circuit, the DC voltage with two frequency multiplication or six frequency multiplication is obtained, and the DC voltage is transferred to other circuits via the input filtering inductor. The passive power factor correction circuit of the present disclosure is mainly composed of an AC power rectifying circuit, a capacitor, a diode and three inductor elements, and the AC power rectifying circuit includes an AC power supply and a rectifying circuit.

Conventional AC/DC converter always uses bridge rectification device as the previous stage rectification circuit, and the output end of the conventional AC/DC converter is connected to the shunt capacitor in parallel for filtering and storing energy. The capacitance of the shunt capacitor is inversely proportional to the output ripple voltage. To obtain small ripple, the capacitance of the shunt capacitor must also be increased, but along with the capacitor capacitance value increase, also means that during the input AC current voltage cycle period, the time which the input AC current voltage lower than the capacitor voltage will be increased. In this way, it will reduce the conduction time of the diode in the bridge rectified device and increase the conduction current peak value, causing that the input current waveform distortion and power factor reduction. On the other hand, the present disclosure through the role of the circuit design and the resonance circuit so that each capacitor and inductor of the charge and discharge time constant as the desired value. The purpose of control diode conduction time and the capacitor discharge time is to deliver the input capacitor storage energy into the load end before the current of the energy storage inductor become zero. Thus, in the next half working cycle period, the input power supply can continued on the input capacitor charging, so not only can increase the rectifier diode conduction time, can also reduce the size of conduction current peak value to improve the circuit power factor, but can also reduce the impact of output capacitor the circuit power factor and provide stable DC output voltage. In addition, the present disclosure circuit design does not require parallel high capacitance value and life limited electrolytic capacitor filtering, but via the output filter inductance inhibition the current ripple, which flows through the load, and can effectively prolong the service life of the circuit.

Moreover, in the practical application, the present disclosure adopts the passive components design for avoiding the problem that the DC and AC LED streetlight system power is easily affected by the external environment and the input voltage change. Thereby, the circuit of the present disclosure has the advantages of high efficiency, high power factor, high resource re-utilization rate and long service life etc.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A passive power factor correction circuit, comprising:
   a power supply;
   a rectifier, coupled to the power supply for rectifying the power supply and generating an input current;
   a filtering device comprising a filtering inductor, for reducing high order harmonic of the input current;
   a resonance device comprising a first inductor and a first capacitor connected in parallel, and coupled to the filtering device for controlling operation time of the input current; and
   a suppression device, coupled to the resonance device and coupled to a load for suppressing ripple of the input current, the suppression device further comprising a second inductor connected to the load in serial and a diode connected to the load in parallel;
   wherein when the passive power factor correction circuit operates in a first mode, a voltage cross the second inductor is greater than a voltage of the load, and thereby, the diode turns on and the first inductor is charged by the first capacitor.

2. The passive factor correction circuit of claim 1, wherein the second inductor suppresses the ripple of the input current flowing through the load.

3. The passive factor correction circuit of claim 1, wherein the rectifier is a bridge rectifier or other device allowing rectifying AC power into DC power.

4. A passive factor correction circuit, comprising:
   a power supply;
   a rectifier, coupled to the power supply for rectifying the power supply and generating an input current;
   a filtering device comprising a filtering inductor, for reducing high order harmonic of the input current
   a resonance device comprising a first inductor and a first capacitor connected in parallel, and coupled to the filtering device for controlling operation time of the input current; and
   a suppression device coupled to the resonance device and coupled to a load for suppressing ripple of the input current, the suppression device further comprising a second inductor connected to the load in serial and a diode connected to the load in parallel,
   wherein when the passive power factor correction circuit operates in a second mode, a voltage of the input current is greater than a sum of voltage of the filtering inductor, the first capacitor, the second inductor and the load, and therefore, the voltage of the input current respectively conducts charging to the filtering inductor, the first capacitor, the second inductor and the load.

5. The passive factor correction circuit of claim 4, wherein the second inductor suppresses the ripple of the input current flowing through the load.

6. The passive factor correction circuit of claim 4, wherein the rectifier is a bridge rectifier or other device allowing rectifying AC power into DC power.

* * * * *